United States Patent Office 3,452,013
Patented June 24, 1969

3,452,013
AS-TRIAZINO(5,6-b)INDOLES
Jan Mieczyslaw Zygmunt Gladych, Hertford, and John Harold Hunt, Theydon Bois, Essex, England, assignors to Allen and Hanburys Limited, London, England, a British company
No Drawing. Continuation-in-part of application Ser. No. 396,727, Sept. 15, 1964. This application Aug. 7, 1967, Ser. No. 658,644
Claims priority, application Great Britain, Sept. 17, 1963, 35,190/64; July 18, 1967, 33,050/67
Int. Cl. C07d 55/10
U.S. Cl. 260—249.9                                    8 Claims

ABSTRACT OF THE DISCLOSURE

As-triazino[5,6-b]indoles with substituents in the 3 and 5-positions have antiviral activity. Particularly active are the compounds substituted in the 3-position with the substituents hydroxypropylamino, hydroxybutylamino, hydroxyhexylamino, [(1-hydroxymethyl)propylamino], 3-hydroxy-3-methylbutylamino, and 3-hydroxy-2-methyl-2-phenylpropylamino. Also valuable are the compounds with a phenethyl group in the 5-position. The compounds may be converted into salts.

This application is a continuation-in-part of Ser. No. 396,727, filed Sept. 15, 1964, now abondoned.

This invention relates to novel heterocyclic compounds having antiviral activity. More specifically, the invention provides as-triazino[5,6-b]indoles of the general formula

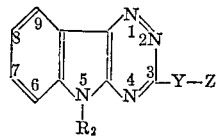

(I)

where $R_2$ is hydrogen or lower alkyl, benzyl or phenethyl, X is an —$NR_3$ radical wherein $R_3$ is a hydrogen atom or a methyl radical, Z is a radical of the general formula —AlkOH, where Alk is a branched or straight chain alkylene radical containing 2 to 10 carbon atoms and may be additionally substituted with an aryl radical. The radical —Alk— in the group —AlkOH may also contain one hydroxy group in the Alk-chain.

The invention also covers the pharmaceutically acceptable salts of the as-triazino[5,6-b]indoles, of the general formula shown above.

The compounds of Formula I are bases and form acid addition salts. The pharmaceutically acceptable salts are included within the scope of the invention.

Among the compounds of the invention, there may be mentioned 3-(2,3-dihydroxypropylamino)-5-methyl-as-triazino[5,6-b]indole,
3-(3-hydroxypropylamino)-5-methyl-as-triazino[5,6-b]indole,
3-(3-hydroxy-2-methyl-2-phenylpropylamino)-5-methyl-as-triazino[5,6-b]indole,
3-(2-hydroxyethylamino)-5-methyl-as-triazino[5,6-b]indole,
3-(2-hydroxyethylamino)-as-triazino[5,6-b]indole,
3-(3-hydroxypropylamino)-as-triazino[5,6-b]indole,
3-(5-hydroxypentylamino)-5-methyl-as-triazino[5,6-b]indole,
3-(6-hydroxyhexylamino)-5-methyl-as-triazino[5,6-b]indole,
3-(4-hydroxybutylamino)-5-methyl-as-triazino[5,6-b]indole,
3-(3-hydroxypropylamino)-5-phenethyl-as-triazino[5,6-b]indole,
3-(3-hydroxybutylamino)-5-methyl-as-triazino[5,6-b]indole,
3-(3-hydroxypropylamino)-5-benzyl-as-triazino[5,6-b]indole,
5-ethyl-3-(3-hydroxypropylamino)-as-triazino[5,6-b]indole,
3-(1-hydroxymethylpropylamino)-5-methyl-as-triazino[5,6-b]indole,
3-(3-hydroxypropylamino)-5-propyl-as-triazino[5,6-b]indole,
3-(3-hydroxy-2-,2-dimethylpropylamino)-5-methyl-as-triazino[5,6-b]indole, and
3-(3-hydroxy-3-methylbutylamino)-5-methyl-as-triazino[5,6-b]indole.

The compounds of formula I may be prepared by the cyclization of isatin β-thiosemicarbazones of the general formula

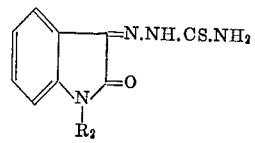

(II)

wherein $R_2$ has the meaning given above, to give 3-mercapto-as-triazino[5,6-b]indoles of the general formula

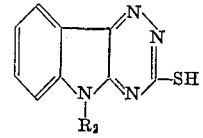

(III)

wherein $R_2$ has the meaning given above and converting the compounds of Formula III to compounds of Formula I by conventional methods.

The thiosemicarbazones of Formula II may be cyclized to give the compounds of Formula III by, for example, refluxing in the presence of ammonia or aqueous potassium carbonate. Alternatively, the thiosemicarbazones need not be isolated in which case thiosemicarbazide and the isatin of formula

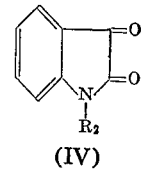

(IV)

wherein $R_2$ has the meaning given above, are refluxed together in aqueous potassium carbonate solution.

Compounds of Formula I in which X is $NR_3$, wherein $R_3$ has the meaning given above, and Z has the meaning given above, may be prepared by reacting a 3-mercapto-as-triazino[5,6-b]indole of Formula III with an aminating agent, which may be for instance, a hydroxyalkylamine. The compound of Formula II may be heated, under reflux, with the aminating agent in an inert solvent such as butanol or an excess of the reacting amine may be used as the solvent. Alternatively, if the aminating agent is a low boiling amine, an alcoholic solution of it may be heated in a sealed tube with the compounds of Formula III. The latter, in the solid form, are mainly in the 3-thione structure C=S.

If desired, the basic compounds of Formula I obtained by way of the processes given above may be converted into their salts with inorganic or organic acids.

For the purpose of further illustration of this invention, the following examples are set forth in detail below.

EXAMPLE 1

Preparation of 3-mercapto-5-methyl-as-triazino[5,6-b]indole (a) 6.0 g. of N-methylisatin thiosemicarbazone was suspended in 1.5 l. of water containing 15 ml. of ammonia solution of sp.g. 0.880 and the mixture was boiled under reflux for 24 hours. After cooling, a small amount of insoluble material was removed by filtration and discarded. The filtrate was evaporated under reduced pressure to about one third of its volume and, after cooling, the yellow solid which separated was filtered off and recrystallized from 50% aqueous dimethylformamide; 3-mercapto-5-methyl-as-triazino[5,6-b]indole was obtained, M.P. 279°–281° C.

The following compounds were prepared in a similar manner:

3-mercapto - as - triazino[5,6 - b]indole, M.P. higher than 360° C.
3-mercapto-5-ethyl-as-triazino[5,6-b]indole, M.P. 294° C.
3 - mercapto - 5 - propyl - as - triazino[5,6-b]indole, M.P. 278° C.

(b) 5 g. of N-methylisatin thiosemicarbazone was suspended in 100 ml. of water containing 4.4 g. of potassium carbonate and the mixture was boiled under reflux for 75 minutes. The orange colored solution was cooled, diluted with 100 ml. of water and acidified with acetic acid. The yellow solid which separated was filtered off, washed with water, dried at 100° C. and recrystallized from a large volume of methanol to give 3-mercapto-5-methyl-as-triazino[5,6-b]indole, M.P. 278° to 282° C.

The following compound was prepared in a similar manner: 3-mercapto-as-triazino[5,6-b]indole, M.P. higher than 360° C.

(c) 16 g. of N-methylisatin, 10 g. of thiosemicarbazide and 21 g. of potassium carbonate were boiled under reflux in 500 ml. of water for 7 hours. A small amount of insoluble material was removed by filtration and discarded and the filtrate was cooled and acidified with acetic acid. The solid which separated was filtered off, washed with water and dried at 100° C. to give 3-mercapto-5-methyl-as-triazino[5,6-b]indole, M.P. 275° to 281° C.

EXAMPLE 2

Preparation of 3-(2-hydroxyethylamino)-5-methyl-as-triazino[5,6-b]indole 5 g. of 3-mercapto-5-methyl-as-triazino[5,6-b]indole, 10 ml. of 2-hydroxyethylamine and 20 ml. of butanol were boiled under reflux for 8 hours. During the time the solid dissolved and hydrogen sulphide was evolved. On cooling, a yellow solid separated. The mixture was diluted with about 200 ml. of water and the solid was filtered off and recrystallized from 50° aqueous ethanol. The product was obtained as pale yellow needles, M.P. 235° to 236° C.

EXAMPLE 3

Preparation of 3-(3-hydroxypropylamino)-5-methyl-as-triazino[5,6-b]indole

A solution of 2 g. of 3-mercapto-5-methyl-as-triazino-[5,6-b]indole and 20 ml. of 3-aminopropanol was refluxed for 1.5 hours, hydrogen sulphide being evolved. On cooling, the solution was poured into water and the precipitated solid was removed by filtration, washed with water and dried. Recrystallization from ethanol gave 3-(3-hydroxypropylamino)-5-methyl-as-triazino[5,6-b]indole as yellow needles, M.P. 164° to 165° C.

The hydrochloride crystallized from ethanol as yellow needles, M.P. 214° to 215° C.

The following compounds were prepared in a similar manner:

3-(2-hydroxyethylamino)-as - triazino[5,6-b]indole, M.P. 270° to 271° C.
3-(3-hydroxypropylamino)-as-triazino[5,6-b]indole, M.P. 248° to 249° C.

EXAMPLE 4

Preparation of 3-(3-hydroxy-3-methylbutylamino)-5-methyl-as-triazino[5,6-b]indole A mixture of 4.2 g. of 3-mercapto-5-methyl-as-triazino [5,6-b]indole and 6.4 g. of 4-amino-2-methyl-2-butanol was heated in a bath kept at 168° to 170° C. for 45 minutes. The bath temperature was then raised to 180° and the resulting solution was stirred at 170° to 180° C. for 4 hours, hydrogen sulphide being evolved. The mixture was set aside for 63 hours and the semi-solid mass was then stirred with 50 ml. of water. The undissolved solid was filtered off, washed thoroughly with water and dried at 100° C. Recrystallization from isopropanol, about 17 ml. per gm., gave 3.15 g. of the product as pale yellow rosettes, M.P. 192° to 193° C.

EXAMPLE 5

Preparation of 3-(3-hydroxy-2,2-dimethylpropylamino)-5-methyl-as-triazino[5,6-b]indole 6 g. of 3-mercapto-5-methyl-as-triazino[5,6-b]indole in 18 g. of 3-amino-2,2-dimethyl propanol were heated with stirring at 140° to 150° C. for 12 hours until the hydrogen sulphide ceased. The suspension was cooled and poured into water, and the solid which separated was filtered off and dried at 100° C. under vacuo. Recrystallization from isopropanol gave 3.2 g. of 3-(3-hydroxy-2,2 - dimethylpropylamino) - 5 - methyl - as - triazino [5,6-b]indole as yellow platelets, M.P. 228° to 228.5° C.

EXAMPLE 6

Preparation of 3-(3-hydroxypropylamino)-5-phenethyl-as-triazino[5,6-b]indole

A solution of 8 g. of 3-mercapto-5-phenethyl-as-triazino[5,6-b]indole in 29 ml. of 3-amino propanol was heated in a bath at 160° C. for 5 hours, hydrogen sulphide being evolved. The mixture was set aside overnight, and then added to 250 ml. of water. The solid was filtered off, washed with water and dried. Recrystallization from aqueous ethanol gave 7 g. of 3-(3-hydroxypropylamino)-5-phenethyl-as-triazino[5,6-b]indole as clusters of pale yellow needles, M.P. 154.5° to 155° C.

EXAMPLE 7

Preparation of 3-[(1-hydroxymethyl)propylamino]-5-methyl-as-triazino[5,6-b]indole A solution of 10 g. of 3-mercapto-5-methyl-as-triazino [5,6-b]indole in 45 ml. of 2-amino-1-butanol was heated with stirring at 160° to 170° C. for 5½ hours, then cooled and poured into 300 ml. of water. A dark brown gum was salted out of solution which solidified on standing. Recrystallization from benzene gave 2.38 g. of 3-[(1-hydroxymethyl)propylamino] - 5 - methyl - as - triazino[5,6-b]indole, as buff colored rosettes, M.P. 176° to 176.5° C.

EXAMPLE 8

Preparation of 5-ethyl-3-(3-hydroxypropylamino)-as-triazino[5,6-b]indole

A solution of 10 g. of 5-ethyl-3-mercapto-as-triazino [5,6-b]indole in 25 ml. of 3-aminopropanol was heated at 150° to 160° C. for 5 hours, cooled, stirred with 100 ml. of water, and the yellow solid was filtered off, washed with water and dried to give 10 g. of 5-ethyl-3-(3-hydroxypropylamino)-as-triazino[5,6-b]indole as a yellow crystalline solid. Recrystallization of a small sample from ethanol gave pale yellow crystals, M.P. 151° to 152° C.

EXAMPLE 9

Preparation of 3-(3-hydroxypropylamino)-5-benzyl-as-triazino[5,6-b]indole

A solution of 10 g. of 3-mercapto-5-benzyl-as-triazino[5,6-b]indole in 50 ml. of 3-amino-1-propanol was refluxed for 6 hours until the evolution of hydrogen sulphide ceased. The solution was cooled and poured into 300 ml. of water, and the solid which separated was filtered off and dried at 60° C. under vacuo. Recrystallization from alcohol gave 6.8 g. of the product as yellow needles, M.P. 186° to 187° C.

EXAMPLE 10

Preparation of 3-(4-hydroxybutylamino)-5-methyl-as-triazino[5,6-b]indole

A solution of 10 g. of 3-mercapto-5-methyl-as-triazino[5,6-b]indole in 25 ml. of 4-aminobutanol was heated to 160° to 180° C. for 1 hour and 14 minutes, and at 185° to 200° C. for 3 hours and 50 minutes, after which the evolution of hydrogen sulphide had ceased. After cooling and pouring into 200 ml. of water, crystallization began within a few minutes. The mixture was left overnight, then the crystals were filtered, washed thoroughly with water and dried. Recrystallization from ethanol, about 5 ml. per gm., gave 7.35 g. of the product as clusters of yellowish plates, M.P. 146° to 147° C.

EXAMPLE 11

Preparation of 3-(5-hydroxypentylamino)-5-methyl-as-triazino[5,6-b]indole

A solution of 2 g. of 3-mercapto-5-methyl-as-triazino[5,6-b]indole in 10 g. of 5-aminopentanol was heated to 140°–160° C. for 30 minutes, hydrogen sulphide being evolved. On cooling the solution was poured into water and the precipitated solid was filtered off, washed with water and dried. Recrystallization from ethanol gave 3 - (5 - hydroxyphentylamino) - 5 - methyl - as - triazino [5,6-b]indole as yellow needles, M.P. 158° to 158.5° C. Hydrochloride: yellow needles, M.P. 191° to 192° C. (from ethanol).

The following compound was obtained in a similar manner:

3 - (6 - hydroxyhexylamino) - 5 - methyl - as - triazino [5,6-b]indole, M.P. 124° to 125° C.

EXAMPLE 12

Preparation of 3-(3-hydroxypropylamino)-5-propyl-as-triazino[5,6-b]indole

A solution of 10 g. of 3-mercapto-5-propyl-as-triazino[5,6-b]indole in 50 ml. of 3-aminopropanol was heated at 160° C. (bath temperature) for 5 hours, after which the evolution of hydrogen sulphide ceased. The mixture was poured into water and the precipitate filtered, washed with water and dried at 100°. Recrystallization from benzene-light petroleum (B.P. 80° to 100°) gave 7.6 g. of 3 - (3 - hydroxypropylamino) - 5 - propyl - as - triazino [5,6-b]indole as pale yellow crystals, M.P. 142.5° to 143.5° C.

EXAMPLE 13

Preparation of 3-(3-hydroxybutylamino)-5-methyl-as-triazino[5,6-b]indole

A solution of 5 g. of 3-mercapto-5-methyl-as-triazino[5,6-b]indole in 8.2 g. of 4-amino-2-butanol was heated at 160° to 170° C. (oil bath temperature) for 5½ hours. The solid which had separated on cooling was stirred with 80 ml. of water and the undissolved solid was filtered, washed thoroughly with water and dried at 100° C. Recrystallization from a mixture of 70 ml. of ethanol and 50 ml. of light petroleum ether, B.P. 80° to 100°, gave 4.05 g. of the product as clusters of pale yellow needles, M.P. 168° to 168.5° C.

EXAMPLE 14

Preparation of 3-(2,3-dihydroxypropylamino)-5-methyl-as-triazino[5,6-b]indole

A solution of 10 g. of 3-mercapto-5-methyl-as-triazino[5,6-b]indole in 30 ml. of 1-amino-2,3-propanediol was heated at 170° to 190° C. for 5½ hours until the hydrogen sulphide evolution had ceased. The solution was cooled, poured into methanol, the solid was filtered off, washed with methanol and dried at 50° C. under vacuo. Recrystallization from ethanol gave 5.1 g. of 3-(2,3-dihydroxypropylamino) - 5 - methyl - as - triazino[5,6-b]indole as pale yellow rosettes, M.P. 194° to 195° C.

EXAMPLE 15

Preparation of 3-(3-hydroxy-2-methyl-2-phenylpropylamino)-5-methyl-as-triazino[5,6-b]indole 10 g. of 3-mercapto-5-methyl-as-triazino[5,6-b]indole and 30 g. of 3-amino-2-methyl-2-phenyl propanol were heated with stirring at 170°–185° C. for 7 hours until all the hydrogen sulfide had evolved. The mixture was cooled and 85 mls. of acetone were added with scratching. The solid which separated was filtered off, washed with ether and dried at 100° C. under vacuo. Recrystallization from isopropanol gave 5.4 g. of the triazino indole as yellow needles, M.P. 186.5–188° C.

Several methods have been used for testing the antiviral activity of the compounds of the invention. The general method consists of adding each dose of the compound under test to 8 tubes of confluent cells, adding 16 hours later a 100 $TCD_{50}$ challenge of a virus to 4 of the tubes, the other 4 being kept for cytotoxicity controls. With each groups of samples 10 tubes are kept as normal tissue controls and 10 are infected with 100 $TCD_{50}$ of virus. After 72 hours the tubes are read microscopically for evidence of virus cytopathic effect. Test procedures and results are reported below.

A. Antiviral activity against rhinovirus in a tube dilution test

Tube cultures of diploid human embryonic lung (WI–26) cells were obtained from Baltimore Biological Laboratories in Eagle's Minimum Essential Medium with 10% fetal calf serum.

The medium was aspirated off the cultures and replaced with 1 ml. of growth medium [Eagle's Minimum Essential Medium with non-essential amino acids, prepared as described by Eagle, Science, 130, 432 (1959)] and 10% fetal calm serum. The medium of paired cultures was supplemented with 500, 100, 20 and 4 γ/ml. of the compound under test. Four cultures were used as untreated controls. The cultures were incubated at 34° C. in a roller drum (12 r.p.h.). After 3 days the cultures were examined microscopically for evidence of compound toxicity of the compound, that is alteration in cell morphology observed in unstained cultures at 100× magnification. The maximum compound concentration providing no indication of toxicity in either of the two cultures was the maximum well-tolerated concentration.

The tube cultures described above were then used for the activity determination. Five-tenths ml. of an appropriate dilution of virus in growth medium containing 10 $TCID_{50}$ (tissue culture infective dose, that is, dose causing infection of 50% of the culture) were added to 40 cultures. Five-tenths ml. of growth medium were added to four cultures to be used as cell controls. The cultures were then incubated at 34° C. Excess virus or growth medium was removed after 1 hour and 1 ml. of growth medium was added to each culture. Four noninfected cultures used as cell controls and eight infected cultures used as virus controls were maintained in unsupplemented medium. Eight infected cultures were used to determine the antiviral activity of each compound concentration; these received 1, 1/5, 1/25 and 1/125 WTD (well tolerated dose) of test compound diluted with the growth medium. The cultures were rolled at 34° C. The cultures were examined microscopically after four days and scored on the basis of extent of cytopathic effect. The Nos. 1059, 2060 and 33,342, in the table below designate particular strains of rhinovirus.

tion were the plaques. At the same time, the test compound diffused from the disc, and if active, inhibited the production of plaques. A vital stain was added to provide contrast so that the plaques appeared as clear areas against a background of stained cells. If a com-

TABLE I

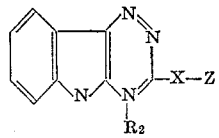

| Substituents | | | Therapeutic Ratio vs. Rhinovirus Strains | | | | Cpd. No. |
|---|---|---|---|---|---|---|---|
| $R_2$ | X | Z | 1059 | HGP | 2060 | 33342 | |
| $CH_3$ | NH | $CH_2CH_2CH_2OH$ | 100/20 | 100/100 | 100-500/20-100 | 20/20-.8 | 1581 |
| $C_2H_5$ | NH | $CH_2CH_2CH_2OH$ | 100/100 | 100-500/100 | | 20/4 | 2384 |
| $C_3H_7$ | NH | $CH_2CH_2CH_2OH$ | 100-20 | | | | 2536 |
| $C_6H_5CH_2$ | NH | $CH_2CH_2CH_2OH$ | 500/4 | | | 500/100-20 | 2343 |
| $C_6H_5CH_2CH_2$ | NH | $CH_2CH_2CH_2OH$ | 500/4 | 500/500; 4/4 | 500/500 | 100/4 | 2603 |
| $CH_3$ | NH | $(CH_2)_4OH$ | 100/20 | 100/4-20 | 500/100 | 500/20 | 2262 |
| $CH_3$ | NH | $(CH_2)_5OH$ | 500/100 | | | | 2568 |
| $CH_3$ | NH | $(CH_2)_6OH$ | 100/20 | 100/20 | 100-500/100 | 100-500/4-20 | 2284 |
| $CH_3$ | NH | $CH_2CH_2-\underset{\underset{CH_3}{\vert}}{\overset{\overset{CH_3}{\vert}}{C}}-OH$ | 500/20 | 500/20 | 500/100 | | 3002 |
| $CH_3$ | NH | $CH_2-\underset{\underset{CH_3}{\vert}}{\overset{\overset{CH_3}{\vert}}{C}}-CH_2OH$ | 500/20 | 500/4 | 500/100 | | 2692 |

Particularly favorable results were obtained with compounds 1581, 2262, 2284, 2343, 2568, 2603, 2692 and 3002.

B. Tissue culture (vaccinia virus)

Vaccinia virus is an agent capable of producing intracerebral infections in a living organism. The study of the activity of the compounds of the invention against this virus was conducted by the agar-diffusion-plaque inhibition method, described by Herrmann, "The Detection, Assay and Evaluation of Antiviral Drugs," Progress Med. Virol. 3, 158 (1961), which permits simultaneously a determination of the activity and also the toxicity of the substance under test. The test was conducted as follows:

Dispersed susceptible cells in a growth-promoting medium were added to Petri dishes which were then incubated for several days to a week until a continuous layer of cells had grown to cover the bottom of the Petri dish. The culture was then infected by incubation for a brief interval with an appropriate dilution of virus. An overlay of agar-containing maintenance medium was then added. On top of the hardened agar was placed a filter paper disc impregnated with 100 μg. of the compound under test and the cultures were then incubated. In the controls, the virus spread radially from the initially infected cells, destroying cells as it progressed. These areas of cell destrucpound was toxic, an area surrounding the disc was devoid of healthy cells and plaques, as manifested by a decreased intensity of the stain or by microscopic examination.

In this manner it was possible simultaneously to determine the activity as well as the toxicity of the compound under test. The results are tabulated in Table II below, where lack of toxicity is designated as 0, a zone of toxicity of radius less than 10 mm. is designated at 1, and a zone of toxicity of radius greater than 10 mm. is designated as 2. Activity is denoted by an area surrounding the disc, or zone of toxicity, which is devoid of plaques. Lack of activity is designated as 0, a zone of activity of radius less than 10 mm. is designated as 1, and a zone of activity of radius greater than 10 mm. is designated as 2.

TABLE II

| Substituents | | | Activity | Toxicity | Compound No. |
|---|---|---|---|---|---|
| $R_2$ | X | Z | | | |
| $CH_3$ | NH | $CH_2CH_2CH_2OH$ | 1 | 1 | 1581 |
| $CH_3$ | NH | $(CH_2)_6OH$ | 2 | 1 | 2284 |
| $C_6H_5CH_2$ | NH | $CH_2CH_2CH_2OH$ | 1 | 0 | 2343 |
| $C_2H_5$ | NH | $CH_2CH_2CH_2OH$ | 1 | 1 | 2384 |
| $C_3H_7$ | NH | $CH_2CH_2CH_2OH$ | 1 | 1 | 2445 |
| $CH_3$ | NH | $(CH_2)_5OH$ | 2 | 1 | 2568 |
| $C_6H_5CH_2CH_2$ | NH | $CH_2CH_2CH_2ON$ | 1 | 0 | 2603 |

C. Efficiency of compounds against vaccinia virus in mouse tail infection

Several of the most promising compounds, namely, 1581, 2603, 3002, 2692 were tested for their activity in decreasing the lesions in the tails of mice infected intravenously with vaccinia virus.

Discrete dermal lesions were produced on the tails of mice infected intravenously with vaccinia virus. The number of lesions and the proportion of mice demonstration lesions were directly related to concentration of virus in the inoculum. Lesions appeared after a period of 6 to 7 days and were easily counted on the eighth day by swabbing the tail with a solution of 1% fluorescein and 0.5% methylene blue. The compounds under test were administered subcutaneously once daily, beginning 24 hours after infection. The extent of reduction in the number of lesions was considered the criterion of activity. The results obtained with the indicated triazinoindoles are tabulated in Table III.

TABLE III

| Compound | Dose (mpk.) | Reduction in No. of lesions, percent |
| --- | --- | --- |
| 1581 | 400 | 70 |
| 2603 | 400 | 80 |
| 3002 | 100 | 50 |
| 2692 | 400 | 25 |

The highest activity was noted with 2603, that is, 3-(3-hydroxypropylamino)-5-benzyl - as - triazino[5,6-b] indole.

Good activity was also noted with 1581, that is, 3-(3-hydroxypropylamino)-5-methyl-as-triazino[5,6-b]indole.

The table below, Table IV summarizes the most valuable substituents not only in the 3-position, but also in the 5-position.

TABLE IV

| $R_2$ | XZ |
| --- | --- |
| H | —NH(CH$_2$)$_{3-6}$OH (O- lower esters and N-oxide derivatives) |
| Methyl | —NHCHCH$_2$CH$_3$ <br> \| <br> CH$_2$OH |
| Ethyl | CH$_3$ <br> \| <br> —NHCH$_2$CCH$_2$OH <br> \| <br> CH$_3$ |
| Propyl | —NH—CO—CH$_3$ |
| Benzyl | CH$_2$—CH$_2$—CH$_2$—OCOCH$_3$ |
| Phenethyl | —NHCH$_2$CH$_2$CH$_2$NHCOCH$_3$ <br> CH$_3$ <br> \| <br> —NHCH$_2$CH$_2$C—OH <br> \| <br> CH$_3$ |

The compounds of the invention possess antiviral activity, particularly against rhinovirus and vaccinia virus. They may be formulated for use in a manner well known to pharmaceutical chemists by combining them with standard pharmaceutical excipients to form tablets, capsules, ointments and intransal preparations. The oral formulations may contain between 100 mgs. and 1 g. and may be administered 1–4 times daily.

The preparation of these pharmaceutical compositions is illustrated below.

EXAMPLE 16

Capsules.—300 kg. of one of the compounds of this invention, for instance, 3-(3-hydroxypropylamino)-5-methyl-as-triazino[5,6-b]indole were finely divided in a comminuting mill to produce a 60 B.S. mesh powder. This was filled into No. 1 hard gelatin capsules so that each capsule contained 300 mg. of the active ingredient.

In a similar manner, capsules were prepared from the compounds of Examples 4, 5, 13 and 15.

EXAMPLE 17

Tablets.—3.00 kg. of one of the compounds of this invention, for example, 3-(3-hydroxypropylamino)-5-methyl-as-triazino[5,6-b]indole, 300 g. of maize starch, 400 g. of lactose and 80 g. of hydrolyzed gelatin were mixed together, then sufficient distilled water was added to produce a damp cohesive mass. The mass was passed through a 16 B.S. mesh screen to produce granules which were dried and then passed through a screen to produce 20 B.S. mesh granules. The dried granules were mixed with 300 g. of maize starch, 800 g. of microcrystalline cellulose, 60 g. of polyethylene glycol 4000 and 60 g. of magnesium stearate. The lubricated granules were compressed on a suitable tabletting machine to produce tablets each weighing 500 mg. and containing 300 mg. of 3-(3 - hydroxypropylamino)-5-methyl - as - triazino[5,6-b]-indole.

In a similar manner tablets were prepared from the compounds of Examples 4, 5, 13 and 15.

EXAMPLE 18

Nasal suspension.—100 g. of sodium carboxymethyl-cellulose of medium viscosity grade were dissolved in 5 litres of distilled water. When solution was complete, 20 g. of sodium citrate, 13 g. of potassium biphthalate, 0.1 g. of thiomersal and 2 ml. of eucalyptol were added. The mixture was stirred until solution took place. 500 g. of one of the compounds of this invention, for instance, 3 - (3-hydroxypropylamino)-5-methyl-as-triazino[5,6-b]-indole were slowly dispersed in the gel, and the volume was made up to 10 litres with distilled water.

In a similar manner nasal suspensions were prepared from the compound of Example 4.

What is claimed is:

1. An as-triazino(5,6-b)indole of the formula:

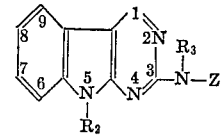

wherein
R$_2$ is hydrogen, alkyl of 1 to 4 carbon atoms, benzyl or phenethyl,
R$_3$ is hydrogen or methyl and,
Z is alk OH, wherein alk is an unsubstituted straight or branched chain alkylene of 2 to 10 carbon atoms or dihydroxypropyl, or pharmaceutically acceptable acid addition salts thereof.

2. An as-triazino[5,6-b]indole according to claim 1 wherein R$_2$ is lower alkyl of 1 to 4 carbon atoms, benzyl or phenethyl, R$_3$ is hydrogen, and Z is alk OH, wherein alk is straight or branched chain alkylene of 2 to 10 carbon atoms.

3. An as-triazino[5,6-b]indole according to claim 1 wherein R$_2$ is methyl, R$_3$ is hydrogen, and Z is alk OH, wherein alk is straight or branched chain alkylene of 5 carbon atoms.

4. The compound according to claim 1 which is 3-(3-hydroxypropylamino)-5-methyl-as-triazino[5,6-b]indole.

5. The compound according to claim 1 which is 3-(6-hydroxypropylamino)-5-methyl-as-triazino[5,6-b]indole.

6. The compound according to claim 1 which is 3-(5-hydroxypropylamino)-5-methyl-as-triazino[5,6-b]indole.

7. A compound according to claim 1 which is 3-(2,3-dihydroxypropylamino)-5-methyl-as-triazino (5,6-b) indole.

8. The compound 3-(3-hydroxy-2-methyl-2-phenylpropylamino)-5-methyl-as-triazino-[5,6-b]indole.

References Cited

FOREIGN PATENTS 1,023,205  3/1966  Great Britain.
1,023,720  3/1966  Great Britain.

ALEX MAZEL, Primary Examiner.

JOSE TOVAR, Assistant Examiner.

U.S. Cl. X.R.

260—249.5, 325; 424—249

UNITED STATES PATENT OFFICE
CERTIFICATE OF CORRECTION

Patent No. 3,452,013　　　　　　　　　　　　　　　　June 24, 1969

Jan Mieczyslaw Zygmunt Gladych et al.

It is certified that error appears in the above identified patent and that said Letters Patent are hereby corrected as shown below:

Column 10, lines 26 to 32, the formula should appear as shown below:

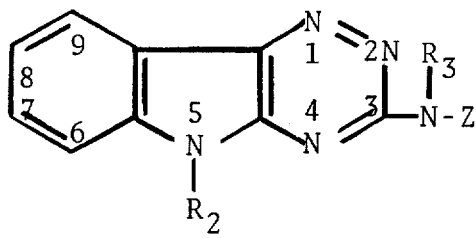

same column 10, lines 53 and 55, "hydroxypropylamino", each occurrence, should read -- hydroxyhexylamino --.

Signed and sealed this 5th day of May 1970.

(SEAL)
Attest:

EDWARD M. FLETCHER, JR.　　　　　　　WILLIAM E. SCHUYLER, JR.
Attesting Officer　　　　　　　　　　　Commissioner of Patents